United States Patent [19]

Doran

[11] Patent Number: 4,881,788

[45] Date of Patent: Nov. 21, 1989

[54] APPARATUS AND METHODS FOR PROCESSING OPTICAL SIGNAL WITH WAVEGUIDES EXHIBITING SOLITON EFFECTS

[75] Inventor: Nicholas J. Doran, Cambridge, England

[73] Assignee: British Telecommunications, plc, London, United Kingdom

[21] Appl. No.: 209,477

[22] PCT Filed: Oct. 20, 1987

[86] PCT No.: PCT/GB87/00740

§ 371 Date: Jun. 20, 1988

§ 102(e) Date: Jun. 20, 1988

[87] PCT Pub. No.: WO88/02876

PCT Pub. Date: Apr. 21, 1988

[30] Foreign Application Priority Data

Oct. 20, 1986 [GB] United Kingdom ............... 8625088
Oct. 22, 1986 [GB] United Kingdom ............... 8625281
Jul. 22, 1987 [GB] United Kingdom ............... 8717376

[51] Int. Cl.⁴ ............................................. G02B 6/26
[52] U.S. Cl. ............................... 350/96.15; 350/96.16; 350/96.29; 455/611; 455/612
[58] Field of Search ............... 350/96.15, 96.16, 96.29; 455/610–612, 608

[56] References Cited

U.S. PATENT DOCUMENTS

| | | | |
|---|---|---|---|
| 4,558,921 | 12/1985 | Hasegawa et al. | 350/96.29 |
| 4,633,524 | 12/1986 | Hasegawa | 455/612 |
| 4,635,263 | 1/1987 | Mollenauer | 350/96.15 X |
| 4,699,452 | 10/1987 | Mollenauer et al. | 350/96.16 |
| 4,700,339 | 10/1987 | Gordon et al. | 455/612 X |
| 4,741,587 | 5/1988 | Jewell et al. | 350/96.15 |
| 4,749,248 | 6/1988 | Aberson Jr. et al. | 350/96.15 X |

OTHER PUBLICATIONS

Optics Letters, vol. 10, No. 8, Aug. 1985, Optical Society of America (New York), (U.S.), H. Kawaguchi: "Proposal for a New All-Optical Waveguide Functional Device", pp. 411–413.

IEEE Journal of Quantum Electronics, vol. QE-19, No. 12, Dec. 1983, (New York), (U.S.), N. J. Doran et al.: "Solitons in Optical Communications", pp. 1883–1888.

Optics Letters, vol. 9, No. 1, 1984, L. F. Mollenauer et al., "The Soliton Laser".

Primary Examiner—John D. Lee
Assistant Examiner—John Ngo
Attorney, Agent, or Firm—Nixon & Vanderhye

[57] ABSTRACT

An optical device comprises first and second optical waveguides connected between respective output and input ports of first and second optical couplers. The first coupler has at least one input port and is adapted to couple optical signals received at the input port into its output ports in a predetermined coupling ratio. The second coupler has at least one output port and is adapted to couple optical signals received at each input port into its output port in a predetermined coupling ratio. The first and second waveguides define respective optical paths with substantially the same optical length. The waveguides are fabricated from materials which exhibit soliton effects when optical pulses, at working intensities, are injected into the waveguides, such that the pulse propagation is dispersion dependent, whereby the portions of an optical pulse received at the input of the first coupler are coupled into the waveguides by the first coupler and arrive synchronously but phase shifted relative to one another at the second coupler after travelling along the waveguides. The device may be configured to provide optical switching and logic functions.

11 Claims, 4 Drawing Sheets $\alpha = 4$
$\beta = 1$
ARM LENGTH = $2\pi$
$\emptyset = 3\pi/4$

APPARATUS AND METHODS FOR PROCESSING OPTICAL SIGNAL WITH WAVEGUIDES EXHIBITING SOLITON EFFECTS

The invention relates to an optical device for example for use as an optical logic element, an optical amplifier, or an optical switch.

All-optical devices have the potential for performing switching/logic operations at an extremely rapid rate since optical frequencies are high ($\sim 10^{14}$ Hz). In order to exploit this potential it is necessary to construct devices which respond differently to different optical inputs. This essentially means a device which responds to different light intensities, ie a non-linear device. The major problem in realising these devices is that the non-linear response in most materials is very small, and extremely high light intensities are thus required for operation.

There are two main routes for solution of this problem. The first is to look for materials with enhanced non-linearities, this usually means some resonant non-linearity as for example in InSb near the band gap. Large non-linearities can be obtained, but the response time of the non-linearity is correspondingly reduced and much of the fast switching potential of optical processing is lost. The second approach is to use pulses of light of ultra short duration enabling high peak powers to be obtained without excessive energy in the pulses. The fundamental drawback with the second procedure is that the optical non-linearity responds to the local intensity so that varying responses are found throughout the varying intensity of the pulse envelope. This can result for example in just the central part of the pulse switching in a given logic element.

A paper entitled "Proposal for a new all-optical waveguide functional device", Optics Letters, Vol 10, No 8, pages 411–413, by Hitoshi Kawaguchi, describes an unequal arm-length Mach-Zehnder interferometer. The paper proposes that by fabricating the interferometer using materials exhibiting a significant optical Kerr effect the device can perform various logic functions. There are two major potential drawbacks of this proposed device:

(1) A signal (whether a pulse in the optical intensity, or a phase or frequency shift) would be differentially delayed owing to the differing optical path lengths in the two arms. Hence the device would only work satisfactorily when the signal duration itself exceeds the relative delay. The device would not then be suitable for very high speed, short pulse operation for simple signal processing or optical logic.

(2) The device is adapted to respond purely to the instantaneous optical intensity and consequently would not perform well in response to real optical pulses having finite rise and decay times, since different parts of the pulse envelopes would switch differently.

It is an object of the present invention to provide a device which avoids or at least mitigates the aforementioned problems.

In accordance with the present invention in a first aspect, an optical device comprises first coupling means having at least one input port and two output ports and second coupling means having at least one output port and two input ports, each coupling means having a predetermined coupling ratio from input to output, and first and second optical waveguides connecting each output of the first coupling means with a corresponding input of the second coupling means, the waveguides comprising material which supports soliton effects when optical pulses at appropriate working intensities are injected into the waveguides, the first and second waveguides defining respective optical paths with substantially the same optical length, the length being sufficient for the intensity dependent phase of an injected pulse to be substantially uniform throughout the pulse, whereby portions of an optical pulse received at the input port of the first coupling means are coupled into the waveguides by the first coupling means and arrive synchronously but with an intensity dependent relative phase shift at the second coupling means after travelling along the waveguides.

Such a device substantially overcomes the above disadvantages by providing the first and second waveguides of the same optical length and by selecting the waveguide length and material properties such that optical pulses of the appropriate working intensity injected into the waveguides exhibit soliton behaviour.

For any waveguide the effective refractive index, n, depends on the optical intensity, and typically satisfies approximately the relation $$n = n_0 + n_2 I$$

where I is the instantaneous optical intensity, $n_0$ is the effective refractive index at low intensities, and $n_2$ is the Kerr coefficient, which depends on the material of the waveguide. It is possible, for example by addition of suitable dopants, to change the value of $n_2$ significantly in a silica based optical fibre.

In addition, any waveguide exhibits dispersion such that different frequencies propagate with different group velocities. Waveguides can be fabricated with different dispersive properties. For example, differences in total dispersion can be achieved by varying the waveguide refractive index profile.

Conventionally, it is desirable to minimise dispersion effects, both by fabricating waveguides with low absolute dispersion and by operating at wavelengths around the dispersion zero for the waveguide. Certainly the devices proposed by Kagamuchi, for example, would not exhibit any significant dispersion under the specified conditions.

However, if the properties of a waveguide are selected such that the Kerr coefficient, $n_2$, and the group velocity dispersion have opposite signs then, if the light is of sufficiently high intensity, a waveguide can be made to support pulses which propagate substantially non-dispersively over several times the length over which a low intensity pulse would disperse. Such pulses are referred to as solitons. An article by N J Doran and K J Blow entitled "Solitons in Optical Communications", IEEE Journal of Quantum Electronics, Vol. QE19, No. 12, December 1983 provides an appropriate discussion of soliton propagation. In the present specification and claims "soliton" is taken to refer to any pulse which exhibits the above property of substantially non-dispersive propagation and not only to so-called "exact" or "pure" solitons, for example, as hereinafter described.

The present invention, in contrast to known devices, specifically employs waveguides with significant dispersion of the required form which permit soliton propagation.

As a soliton pulse propagates in a waveguide, portions of the wave train within the pulse envelope which defines the soliton undergo intensity-dependent phase changes. After some distance of propagation the intensity-dependent phase is essentially uniform throughout the wave train forming the soliton. Thus overall phase changes are dependent on the intensity of the pulse envelope as a whole and not merely on the instantaneous intensities of different portions of the wave train as is the case with non-soliton pulses. For the intensity-dependent phase of a soliton pulse to be substantially uniform throughout the pulse, it has been found that solitons should propagate over a waveguide length at least approximately equivalent to a soliton period or more as described below.

The two waveguides have substantially equal optical length to ensure that portions of an injected pulse propagating in each waveguide arrive synchronously (ie the pulse envelopes arrive in overlapping coincidence) at the second coupling means. Ideally the pulse envelopes in each waveguide should arrive in perfect synchronism. The device performance is degraded if the overlap between the arriving pulse envelopes is decreased. Generally this will be evident as a decrease in contrast in the output as the input intensity is varied. Thus whilst the device may function satisfactorily, for example, where the pulse envelopes are synchronised only to within +50% of the total pulse width, it is generally preferable that the synchronism is to within a smaller fraction of a pulse width. In many applications, where a good switching contrast is desirable, for example, it will be preferable for the syncronism to be within 10% of the pulse width.

A phase difference will exist between the overlapping wave trains within arriving pulse envelopes. Generally the phase difference will comprise a component due to the device geometry which is independent of intensity (the absolute value of which will also depend on the degree of overlap of the pulse envelopes), together with an intensity-dependent component.

To achieve a non-zero, intensity-dependent relative phase shift between the wave trains within the pulse envelopes it is necessary to break the symmetry between the waveguides in some appropriate manner. Conveniently, this may be done by having different dispersions or non-linear coefficients $n_2$, for example. However, since the refractive index varies with $n_2I$, an effective asymmetry may also be obtained by allowing the intensity in each waveguide to differ. This may be achieved, for example, by having waveguides with differing mode field widths (related to the refractive index profile and core dimensions). Any combinations of these differences may also be used to achieve a desired asymmetry.

The waveguides preferably comprise material which simultaneously exhibits both the dispersive and non-linear properties required for soliton propagation. Whilst it is possible to achieve soliton propagation under alternative conditions, for example, when the waveguide comprises an alternating sequence of dispersive and non-linear components, this is not ideal nor particularly desirable since, in physical terms, the effects do not commute. Consequently, a large number of very short lengths of waveguide with the alternating properties would probably be required to achieve a reasonable approximation to the conditions for effective soliton propagation.

Conveniently, the waveguides comprise optical fibres. Alternatively, for example, the waveguides may be fabricated using planar technology (eg based on lithium niobate).

It is generally desirable to propagate equal energy pulses in each of the waveguides. Preferably, therefore, the predetermined coupling ratios of the coupling means are substantially 50:50. However, other coupling ratios may be appropriate if the operating characteristics of the device require to be proportionately altered.

The first coupling means may be provided with a second input port for coupling in a second optical signal. Conveniently, in this configuration the device may be used, for example, as an optical logic element or demultiplexing switch as further described below.

According to another aspect of the present invention a method of processing an optical signal comprising pulses capable of soliton propagation comprises the steps of:

providing a device according to the invention in its first aspect;

inputting a pulse signal into the device at an amplitude appropriate for soliton propagation of the pulse in the device, thereby to provide a processed pulse signal output at least at one output port of the device.

The waveguide parameters are selected appropriately to influence the soliton propagation according to the processing required. The processing may be to perform logic functions on, to amplify, switch or otherwise modify an input pulse signal. The processed pulse signal output will correspondingly comprise a logical output, an amplified, switched or otherwise modified pulse signal. Criteria and preferences for the selection of device parameters are as described above with reference to the invention in its first aspect.

Where the device includes a second input port, the method may further include inputting a second pulse signal to the second port thereby to enable the first pulse signal to be processed in dependence on the second input signal as described in examples below.

Embodiments of an optical device according to the invention and methods of operation will now be described by way of example with reference to the accompanying drawings, in which:

FIG. 1 illustrates one embodiment of a device according to the present invention;

FIGS. 2a, 2b, 3a, 3b, and 4a, 4b illustrate the variation in output at each output port relative to the input (in units of normalised pulse energies) for different combinations of non-linearity and dispersion in the two waveguides of the device of FIG. 1;

Figure 1:
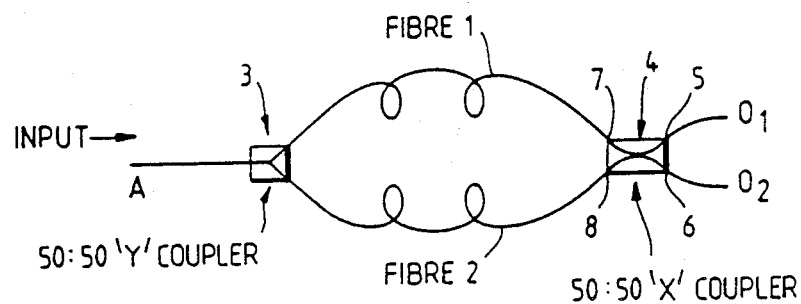

In the device of FIG. 1, a "Y" coupler 3 splits pulse energy from input A equally into two pulses propagating along two silica optical fibres arms 1,2. The split pulses are then recombined at the output end in an "X" coupler 4 having two output ports 5,6.

The final output from each port 5,6 of the coupler 4 is then a combination of the two pulses, and the relative energy in each output 5,6 depends on the relative optical phase of the pulses arriving from the fibre arms 1,2 at the input ports 7,8 of the coupler 4. The lengths of the two arms 1,2 are chosen so that the optical path lengths (or pulse flight times) are substantially the same in both arms, so that the two pulses arrive in coincidence at the output coupler 4. However, the two pulses arriving in coincidence may still have an arbitrary (intensity independent) phase difference, for example, owing to slight differences in the path lengths. This phase difference can be tuned by making sub-wavelength adjustments to the arm lengths.

The non-linearity in each fibre 1, 2 is a third-order effect where the refractive index n depends on the light intensity I through the formula $$n = n_o + n_2 I \tag{1}$$

where $n_o$ is the linear refractive index and $n_2$ is the Kerr coefficient non-linear index of refraction which is $1.2 \times 10^{-22}$ (m/V)$^2$ for silica. The propagation of pulse envelopes $u(z,t)$ in a fibre with negative group velocity dispersion and including non-linearity is described by the dimensionless Non-linear Schrodinger equation (NLS):

$$iu_z + u_{tt}/2 + u|u|^2 = 0 \tag{2}$$

where the subscripts imply partial differentials. The requirement for negative group velocity dispersion determines the positive sign of the $u^2$ term in the NLS. This is a normalised equation and there are transformations to convert the dimensionless quantities back to real units (see eg Doran and Blow op. cit.). Here it is sufficient to point out that the normalised amplitude generated by a real pulse is proportional to $(n_2/k_2)^{\frac{1}{2}}$ and the normalised distance, z is proportional to $k_2/T^2 L$, where $k_2$ is the dispersion coefficient, T is the pulse duration and L is the real distance. The NLS has exact soliton solutions of the initial form $$u(z=0,t) = N\mathrm{sech}(t) \tag{3}$$

with N integer. For all N(integer) the solitons have the property that the modulus of u (and thus the shape of the pulse envelope) returns to its original form every $\pi/2$ propagated (ie the soliton period is $\pi/2$). For $N=1$ the full solution is $$u(z,t) = \exp(iz/2)\mathrm{sech}(t) \tag{4}$$

It is important to note in the above formula the phase factor $\exp(iz/2)$. This is an overall phase which is present in all solitons. That is for all solitons the solution can be written $$u(z,t) = \exp(iz/2) f(z,t) \tag{5}$$

where f(z,t) is periodic in z with period $\pi/2$. It is this property of solitons which is exploited in the present invention.

In FIG. 1 the pulses are launched at A and split 50:50 by the coupler 3. The two arms 1,2 are chosen to have the same optical path length but to have different non-linear coefficients, $n_2$, or different coefficients of dispersion or combinations of these. These differences mean that, although the soliton pulse envelopes arrive synchronously at coupler 4, the soliton pulses will arrive with different phases (see equation 4) and recombination will lead to interference dependent on the relative phases.

To explain the device operation it is helpful to consider a simplified mathematical analysis. In this analysis, the normalisation in the NLS is taken to apply to fibre 1, and the ratio of dispersion in fibre 1 to that in fibre 2 is $\alpha$ and the ratio of the non-linear refractive index terms is $\beta$ (ie $\beta$ represents differences between the waveguides which change $n_2$ and/or I—eg mode field width differences as mentioned above). Then if the pulse in fibre 1 is $a\mathrm{sech}(t)$, the normalised pulse in fibre 2 is $(\alpha/\beta)^{\frac{1}{2}} a\mathrm{sech}(t)$. The soliton period in 1 is $\pi/2$ and in 2 is $\alpha\pi/2$. It must be remembered that these expressions relate to normalised pulses and, using a 50;50 input coupler, the total energy in both arms is the same. Therefore when considering how the pulses recombine at coupler 4 the expressions representative of the pulses must be renormalised before adding. When both "a" and $(\alpha/\beta)^{\frac{1}{2}}$ a are integers the pulses behave as pure solitons in both arms 1,2. In this case, if the lengths of the arms correspond to an integer number of soliton periods for both launched solitons, the outputs from both arms are of the "sech" form. The normalised distance is then $z = m_1(\pi/2)$, where $m_1 = \alpha m_2$ and both $m_1$ and $m_2$ are integers.

In this example, the device arm lengths are chosen to fulfil the above condition for soliton periods in both arms. As the input power is increased the threshold for generating solitons is reached, but the two emerging "sech" pulses will have different phase factors (for $\alpha \neq 1$). If the output from fibre 1 entering the coupler 4, is A(t) and the output from fibre 2 is B(t), where A(t) and B(t) are the slowly varying envelopes of the carrier frequencies, then the outputs at ports 5 and 6 are given by $$\int |A|^2 + |B|^2 + 2\cos(\phi)Re(AB^*) + 2\sin(\phi)Im(AB^*)dt \tag{6}$$

and $$\int |A|^2 + |B|^2 + 2\cos(\phi)Re(AB^*) - 2\sin(\phi)Im(AB^*)dt \tag{7}$$

respectively, where all the arbitrary (intensity independent) phase factors have been absorbed into a single angle, $\phi$ ("the phase shift at zero input intensity"). These results imply that at particular power levels (when exact solitons are launched) all the power can be switched into one or other of the two arms by an appropriate control of $\phi$. Total switching will therefore occur periodically as the power is increased. The switching characteristics at intermediate power levels, however, are not immediately apparent.

Table 1 illustrates some possible choices of $\alpha$ and $\beta$, and the required arm length for operation.

TABLE 1

| $\alpha$ | $\beta$ | $m_1$ | $m_2$ | Fibre length |
|---|---|---|---|---|
| 1 | $\frac{1}{4}$ | 1 | 1 | $\pi/2$ |
| 4 | 1 | 4 | 1 | $2\pi$ |
| 2 | 1 | 2 | 1 | $\pi$ |

The second example ($\alpha = 4$, $\beta = 1$, etc) will now be considered in detail. In this example the two arms 1, 2 have different dispersions but the same non-linear coefficients. This is a very practical situation since it is comparatively straightforward to fabricate fibres with different dispersions at the same wavelength. Table 2 shows example pulse parameters:

TABLE 2

| | FIBRE 1 | FIBRE 2 |
|---|---|---|
| Launched Pulse envelope (ie total input intensity | $a.\mathrm{sech}(t)$ | $2a.\mathrm{sech}(t)$ |

TABLE 2-continued

|  | FIBRE 1 | FIBRE 2 |
|---|---|---|
| of 2a.a at A) | | |
| Output Phase | exp(iπ) | exp(i(π/4 + φ)) |

Thus if $\phi$ is $3\pi/4$ (added to arm 2), then the outputs are in phase when exact solitons occur in both arms ie. for "a" integer. It should be pointed out that as the input power is normalised for fibre 1 and since there is the same power in each arm it is convenient to use fibre 1 units for the total launched power at A, ie. twice the intensity in fibre 1.

Figure 2A:
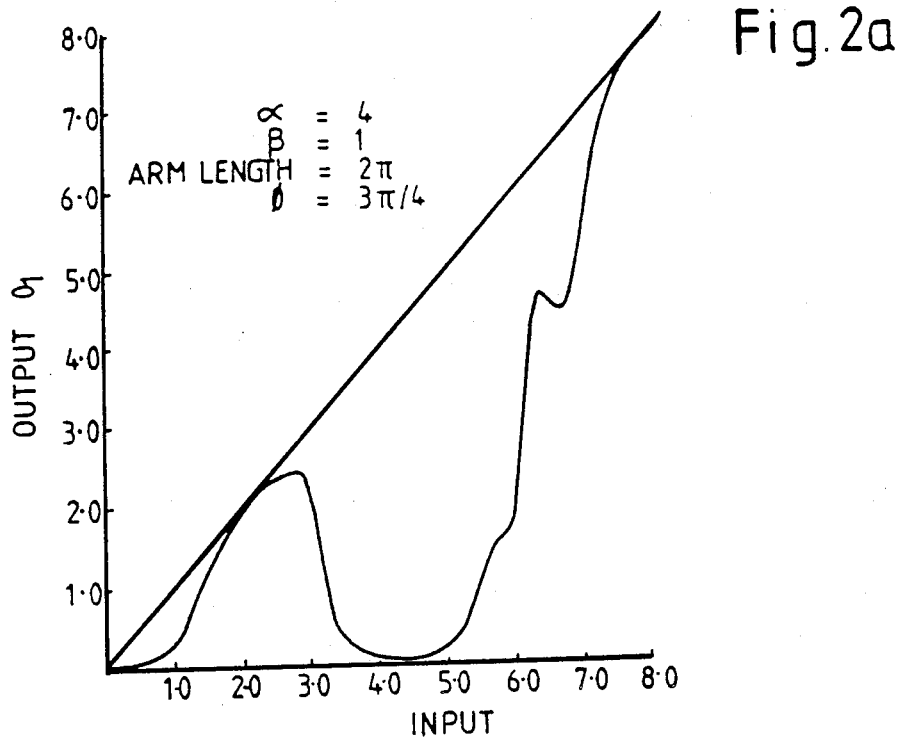
Figure 2B:
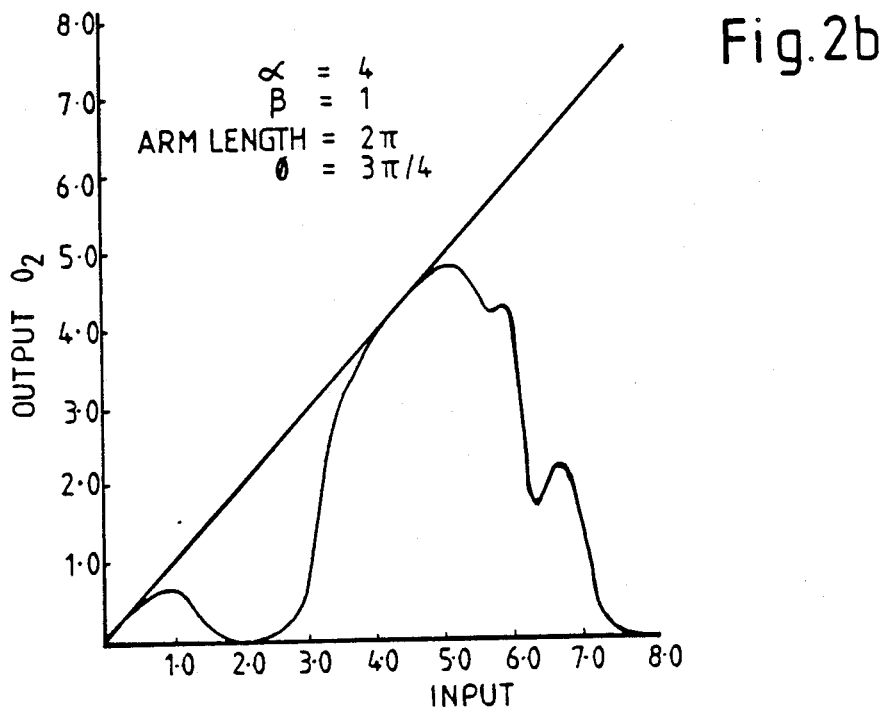

FIGS. 2a and 2b show the calculated output versus the input characteristics for the two ports 5,6 respectively. For convenience, in these and the following related Figures the pulse envelope syncronism at the second coupler 4 has been taken to be ideal (ie complete overlap). As expected, it can be seen that for total normalised input powers of 2 and 8 (ie. a=1 and 2) the input pulse is transmitted out of port 5 (ie. the connection to port 5 is 100% transparent), but for input power of 4 (a=2$^{\frac{1}{2}}$) almost all the power is transmitted out of port 6.

With these operating conditions FIGS. 2a and 2b show that the device can work either as a non-linear switch, or (if we neglect the output from one or other of the ports) can perform the basic logic functions "EXclusive-OR" and "AND". The extinction ratio from these calculated figures is −13 dB but, since the calculations relate to the integrated energy in a pulse, the effective extinction may be much better than this. Concatenation of the devices is possible and will lead to greater extinction ratios since in the "on" state the device is completely transparent and thus, in principle, transmission would not be degraded by concatenation.

Surprisingly, it has also been found that for non-integer values of $(\alpha/\beta)^{\frac{1}{2}}$ good resonances can be obtained, although 100% switching is apparently not possible. For example, choosing the fibre characteristics according to the third set of parameters in Table 1 (where $\alpha/\beta^{\frac{1}{2}}=2^{\frac{1}{2}}$) allows such resonances to be obtained.

Figure 3A:
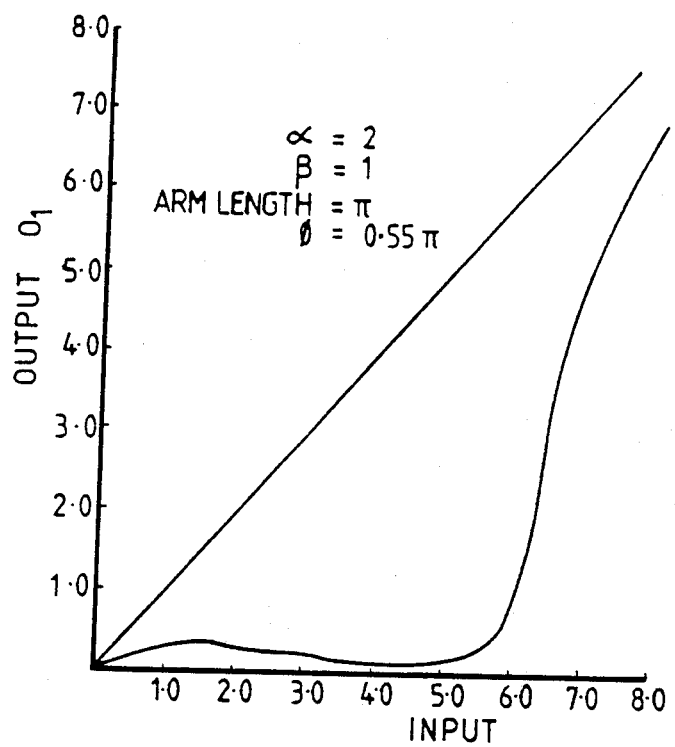
Figure 3B:
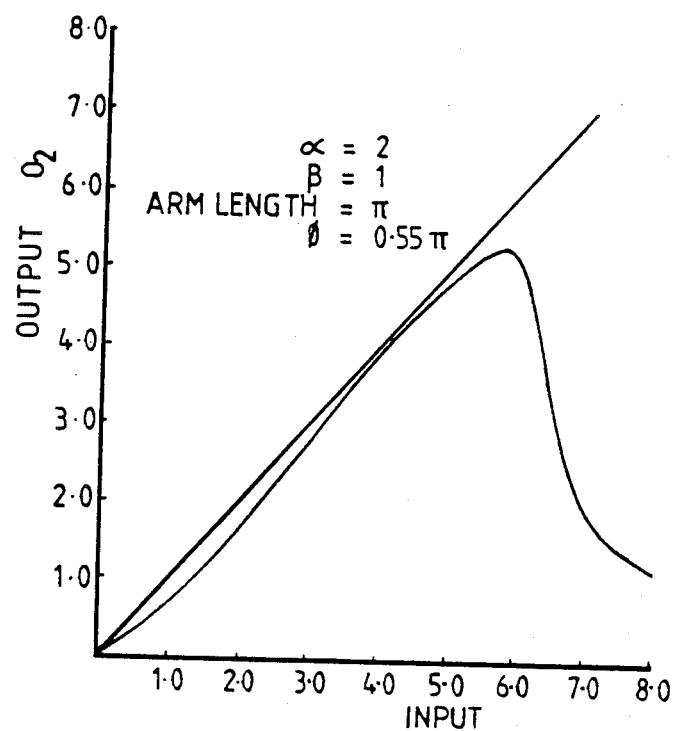

FIGS. 3a and 3b show a clear switching characteristic between the two output ports 5,6 respectively for the case of $\phi=0.55\pi$. This value of $\phi$ could not have been anticipated to give such results and illustrates the principle that switching can also be obtained for non-integer values of $(\alpha/\beta)^{\frac{1}{2}}$ provided the phase $\phi$ is chosen appropriately.

Figure 4A:
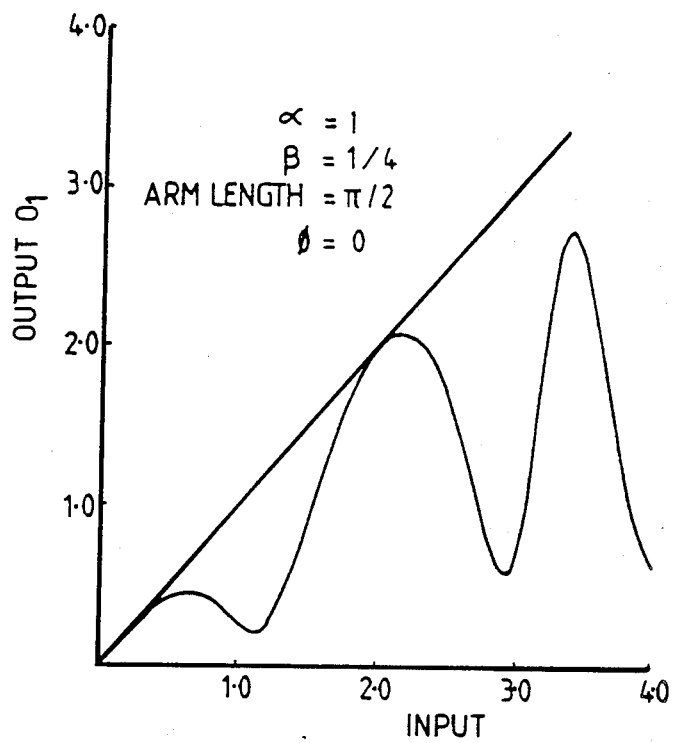
Figure 4B:
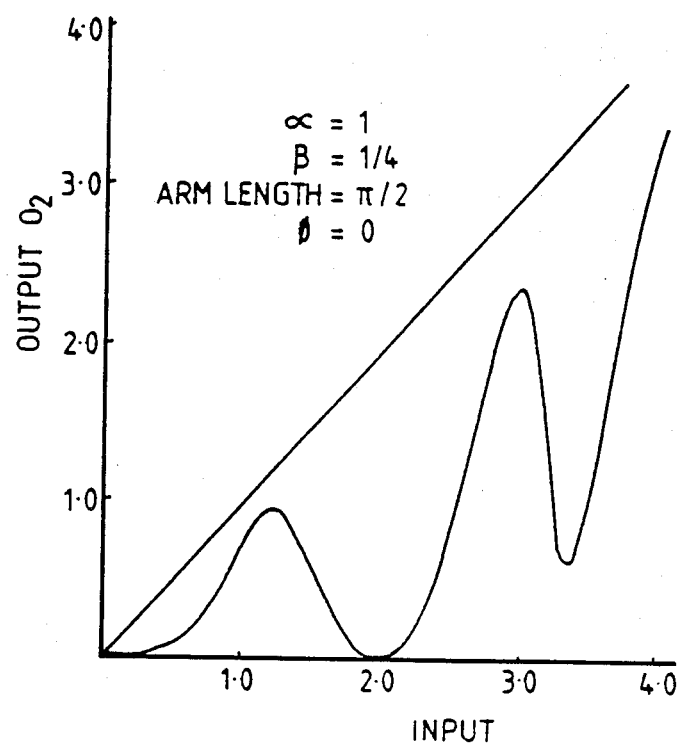

FIG. 4 shows the characteristics for different non-linearities in the two arms with parameters corresponding to the first set in Table 1 ($\alpha=1, \beta=\frac{1}{4}, \phi=0$). Again unexpected resonances are observed.

In these cases the pulses are not propagated as exact solitons and the device operation depends on the uniformity of the pulsse phase for the general pulse asech(t) where "a" is non-integral. From inverse scattering analysis it is possible to consider this type of pulse as a combination of N solitons, which are represented by eigenvalues $\gamma_j$. The eigenvalues are determined from the equation $\gamma_j=a-j+\frac{1}{2}$, where j is an integer. The largest eigenvalue is thus $(a-\frac{1}{2})$. It appears that the phase rotation which applies to the whole pulse is substantially determined by this largest eigenvalue. Thus, although the pulse shape of the non-exact solitons does change, the phase coherence is sufficient to allow switching behaviour (as shown in FIGS. 3 and 4) and the phase shift is given by $\exp(i2(a-\frac{1}{2})^2 z$ to a good approximation. This subsequently developed model thus enables the above observed behaviour and values for $\phi$ to be more effectively predicted. Thus it can be seen that the device of FIG. 1 will also operate when the pulses do not necessarily propagate as ideal solitons.

It will be apparent that the length of the arms in the device of FIG. 1 will determine the preferred nature of the input pulses for soliton operation. Conversely, where the nature of the input pulses is known the preferred dimensions of a device according to the present invention may then be determined. For example, if the arms 1, 2 are of the device of FIG. 1 are fabricated from silica based optical fibres and the fibre parameters are as taken from the second set of Table 1 (ie as for FIG. 2 performance) it is possible to calculate the lengths and powers required as follows. Taking the operating wavelength as 1.55 μm with fibre 1 having a dispersion of 16 ps/nm/km (implying that dispersion in fibre 2 is 4 ps/nm/km), the peak power P (proportional to $\lambda^3 k_2 A/n_2 T^2$) of a pulse of duration T required to generate a single soliton in a single mode fibre with dispersion $k_2$ and effective mode field area A is given by $$P(\text{Watts}) = \lambda^3 A k_2 / (1.17 \times 10^{10} T^2) \qquad (7)$$

where $k_2$ is the dispersion coefficient (in ps/mn/km), A is the area in μm$^2$ and T is the FWHM pulse width in ps. Similarly the soliton period (proportional to $T^2/\lambda^2 k_2$) is given by $$z_0(\text{km}) = 0.952 T^2 / (k_2 \lambda^2) \qquad (8)$$

Taking A=100 μm$^2$ and $\lambda=1.55$, then (7) and (8) give $$P=50.9/T^2, \quad z_0=2.4\times 10^{-2} T^2 \qquad (9)$$

Thus the arms in the device, which in this example are 4 periods long, have a length of $96T^2$ meters. For pulses 1 ps in duration the device would need to be 96 m long. However for pulses 56 fs in duration (ie. 0.056 ps) the device would only need to be 30 cm long. The switching energy (the total energy in the pulse) is −50 pjoules for the 1 ps pulse and 0.9 njoules for the 56 fs pulse.

These calculations show that the longer devices require much lower switching energies. However, the alignment and stability problems for a 96 m device would be severe. A shorter device conversely puts much greater demands on the source input power. The simplest way of reducing the size of the device would be to increase the dispersion. It is possible that special fibres could be fabricated using, for example, dopants to increase the dispersion by large factors. If for example a factor of 100 increase could be obtained then the device would be less than a meter long for 1 ps pulses.

The overall operation of the device is not particularly sensitive to the waveguide parameters. For example the dispersion ratio, $\alpha$, can be altered by 10% and the operation remains essentially unaltered, all that may be required to improve the operation is for a slightly different value of $\phi$ to be chosen. The parameter $\phi$ can be adjusted by altering the length of one of the arms on a sub-wavelength scale. This may be achieved, for example, by the use of a piezoelectric stretching device. Thus, as a general principle, some variation in the device parameters can generaly be compensated for by suitable control of $\phi$.

A device has been described which can perform both ultra-fast optical logic and ultra-fast passive spatial switching. The arms consisting of waveguides are preferably identical apart from having a fixed ratio of group velocity dispersion. The only other requirement is that the $n_2$ in the arms is of opposite sign to the group velocity dispersion. The length of the device does not impose any restriction on the speed of operation since it operates in a pipeline mode. The device is capable in principle of providing passive switching or logic at speeds of up to $10^{14}$ per second.

Figure 5:
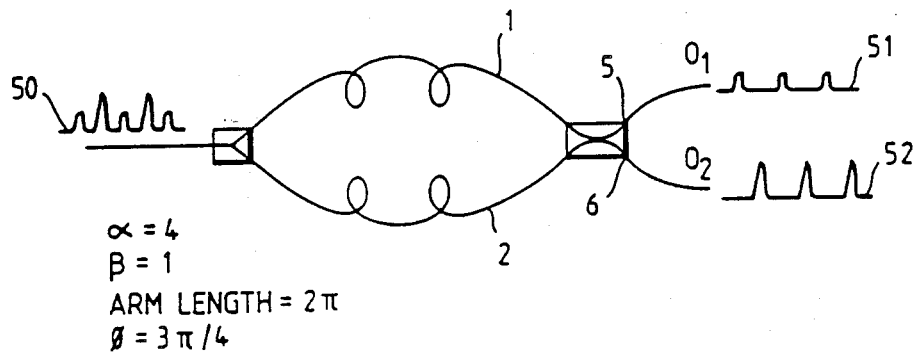
FIG. 5 illustrates a method of operation of the device of FIG. 1.

FIG. 5 illustrates one method of operating the device of FIG. 1 as an optical switch. The device parameters are chosen as before to give the behaviour shown in FIG. 2. An input pulse stream 50 comprises interleaved Nsech(t) pulses with input intensities ($N^2=2$ and 4) corresponding to levels "2.0" and "4.0" of FIG. 2. As shown, the interleaved pulses are separated by the device into two streams 51, 52 of constant intensity pulses. There is negligible loss on switching.

Figure 6:
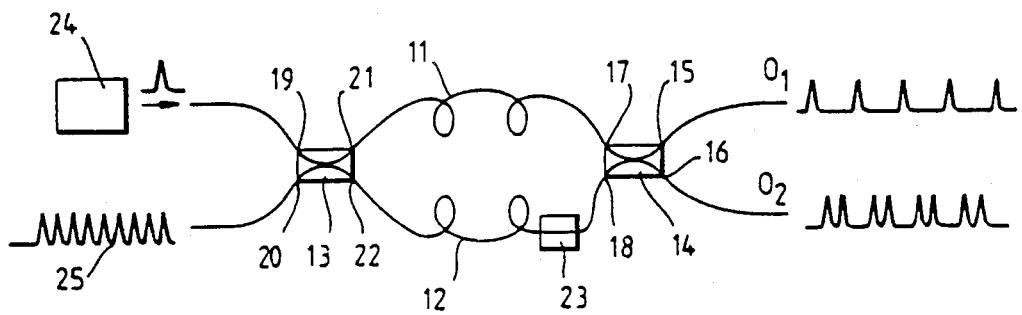
FIG. 6 illustrates an alternative embodiment of a device according to the present invention operating as a demultiplexer.

FIG. 6 illustrates an alternative embodiment of a device according to the invention with provision for input of two signals via ports 19, 20 of an X-coupler 13. A control pulse source 24 is connected to one input port 19 to supply control pulses with desired phase and amplitude characteristics at predetermined intervals. In other respects the device is similar to the device of FIG. 1 and comprises two optical fibre arms 11,12 connecting the output ports 21, 22 of the first X-coupler 13 to the input ports 17, 18 of a second X-coupler 14. A piezoelectric stretcher 23 is provided to tune the length of one fibre arm 12 to adjust the overall device performance (change $\phi$).

In operation, pulses 25 from an input signal stream can be selectively switched under control of the control pulse source 24. For example, the control pulse amplitude and repetition frequency may be adjusted to selectively switch every $n^{th}$ input pulse (n=3 in FIG. 6) from one output path 16 into the other 15 (ie effectively to demultiplex the input signal at some desired rate). To achieve this function, the control pulse needs to be coincident and in phase with each relevant input pulse. Similarly, the control pulse amplitude may be adjusted to provide amplification of selected input pulses in addition, or alternative to the switching function. In another alternative mode of operation, not demanding phase matching, the control pulse may be of an amplitude which differs from that of the signal pulses, but which is switched into the same output path as the signal pulses. The control pulse may then merely be interleaved into the signal pulse stream as, for example, a synchronising pulse, without direct interaction between the control pulse and the pulse stream. Other alternative modes of operation will be apparent to those skilled in the art.

I claim:

1. An optical device comprising first coupling means having at least one input port and two output ports and second coupling means having at least one output port and two input ports, each coupling means having a predetermined coupling ratio from input to output, and first and second optical waveguides connecting each output of the first coupling means with a corresponding input of the second coupling means, the waveguides comprising material which supports soliton effects when optical pulses at appropriate working intensities are injected into the waveguides, the first and second waveguides defining respective optical paths with substantially the same optical length, the length being sufficient for the intensity dependent phase of an injected pulse to be substantially uniform throughout the pulse, whereby portions of an optical pulse received at the input port of the first coupling means are coupled into the waveguides by the first coupling means and arrive synchronously but with an intensity dependent relative phase shift at the second coupling means after travelling along the waveguides.

2. A device according to claim 1, wherein the waveguides have different non-linear refractive index co-efficients.

3. A device according to claim 1 or claim 2, wherein the waveguides have different dispersions.

4. A device according to any of claims 1 or 2, wherein the waveguides comprise optical fibres.

5. A device according to claim 1 or 2 wherein the predetermined coupling ratios are each substantially 50:50.

6. A device according to claim 1 or 2 including means for adjusting the length of one of the waveguides thereby to tune the relative phase shift.

7. A device according to claim 1 or 2 in which the first coupling means has a second input port and the device includes means for providing control pulses to the second input port.

8. An optical switch comprising a device according to claim 1 or 2.

9. A logic element comprising an optical device according to claim 1 or 2 in which the first coupling means comprises two input ports for receiving respective logical optical signals.

10. A method of processing an optical signal comprising pulses capable of soliton propagation comprising the steps of:

providing an optical device having first coupling means with at least one input port and two output ports and second coupling means having at least one output port and two input ports, each coupling means having a predetermined coupling ratio from input to output, and first and second optical waveguides connecting each output of the first coupling means with a corresponding input of the second coupling means, the waveguides comprising material which supports soliton effects when optical pulses at appropriate working intensities are injected into the waveguides, the first and second waveguides defining respective optical paths with substantially the same optical length, the length being sufficient for the intensity dependent phase of an injected pulse to be substantially uniform throughout the pulse, and inputting portions of an optical pulse received at the input port of the first coupling means into the waveguides for soliton propagation such that the pulse portions arrive synchronously but with an intensity dependent relative phase shift at at least one output port of the second coupling means after travelling along the waveguides.

11. A method according to claim 10 wherein the device includes a second input port, including the step of inputting a second pulse signal to the second port thereby to enable the first pulse signal to be processed in dependence on the second input signal.

* * * * *